United States Patent
Kundargi et al.

(10) Patent No.: US 8,787,962 B2
(45) Date of Patent: Jul. 22, 2014

(54) TRANSMIT OPPORTUNITY DETECTION

(75) Inventors: Nikhil Kundargi, Austin, TX (US); Ahmed H. Tewfik, Austin, TX (US)

(73) Assignee: Regents of the University of Minnesota, Minneapolis, MN (US)

( * ) Notice: Subject to any disclaimer, the term of this patent is extended or adjusted under 35 U.S.C. 154(b) by 305 days.

(21) Appl. No.: 13/260,698

(22) PCT Filed: Mar. 26, 2010

(86) PCT No.: PCT/US2010/028891
§ 371 (c)(1),
(2), (4) Date: Jan. 20, 2012

(87) PCT Pub. No.: WO2010/111635
PCT Pub. Date: Sep. 30, 2010

(65) Prior Publication Data
US 2012/0135779 A1    May 31, 2012

Related U.S. Application Data

(60) Provisional application No. 61/164,073, filed on Mar. 27, 2009.

(51) Int. Cl.
| | |
|---|---|
| *H04B 1/00* | (2006.01) |
| *H04B 7/00* | (2006.01) |
| *H04B 1/04* | (2006.01) |
| *H04W 52/34* | (2009.01) |
| *H04W 52/36* | (2009.01) |
| *H04W 52/24* | (2009.01) |

(52) U.S. Cl.
CPC .......... *H04W 52/343* (2013.01); *H04W 52/362* (2013.01); *H04W 52/241* (2013.01)
USPC ............................ 455/522; 455/69; 455/127.1

(58) Field of Classification Search
CPC .................................................... H04W 52/362
USPC ................................................. 455/522, 63.1
See application file for complete search history.

(56) References Cited

U.S. PATENT DOCUMENTS 1,932,932 A * 10/1933 Griffith .................. 178/17 C
2,148,002 A *  2/1939 Warburton .................. 178/36
(Continued)

FOREIGN PATENT DOCUMENTS

WO    WO-2010111635 A1    9/2010

OTHER PUBLICATIONS

"International Application Serial No. PCT/US2010/028891, Search Report mailed May 25, 2010", 3.
(Continued)

*Primary Examiner* — Tilahun B Gesesse
(74) *Attorney, Agent, or Firm* — Schwegman Lundberg & Woessner, P.A.

(57) ABSTRACT

The present application discusses, among other things, apparatus and methods for detecting and using a excess capacity on a wireless network medium. A method embodiment includes calculating a differential metric based on a first metric and a second metric for a primary network. The primary network can have a medium shared with a secondary network. The first metric can be based on a first distribution of traffic on the primary network and can correspond to absence of a perturbation of the medium. The second metric can be based on a second distribution of traffic on the primary network and can correspond to a perturbation of the medium from a node of the secondary network. The method can include selecting a transmission power for the node based on the differential metric.

15 Claims, 6 Drawing Sheets

(56) References Cited

U.S. PATENT DOCUMENTS

| | | | |
|---|---|---|---|
| 2,587,561 A * | 2/1952 | Wilder | 178/69 A |
| 6,957,087 B1 * | 10/2005 | Hedberg | 455/561 |
| 7,092,721 B2 * | 8/2006 | Harris et al. | 455/455 |
| 2003/0092461 A1 | 5/2003 | Moulsley et al. | |
| 2006/0019681 A1 * | 1/2006 | Harris et al. | 455/464 |
| 2006/0084444 A1 | 4/2006 | Kossi et al. | |
| 2008/0160927 A1 | 7/2008 | Bar-ness et al. | |
| 2008/0198948 A1 | 8/2008 | Tang | |
| 2008/0220805 A1 * | 9/2008 | Dayal et al. | 455/522 |
| 2008/0268892 A1 * | 10/2008 | Hamdi et al. | 455/522 |
| 2009/0047916 A1 | 2/2009 | Haykin | |
| 2009/0082057 A1 | 3/2009 | Hwang et al. | |
| 2010/0027517 A1 * | 2/2010 | Bonta et al. | 370/338 |
| 2014/0009063 A1 * | 1/2014 | Cregg et al. | 315/34 |

OTHER PUBLICATIONS

"International Application Serial No. PCT/US2010/028891, Written Opinion mailed May 25, 2010", 5 pgs.

* cited by examiner

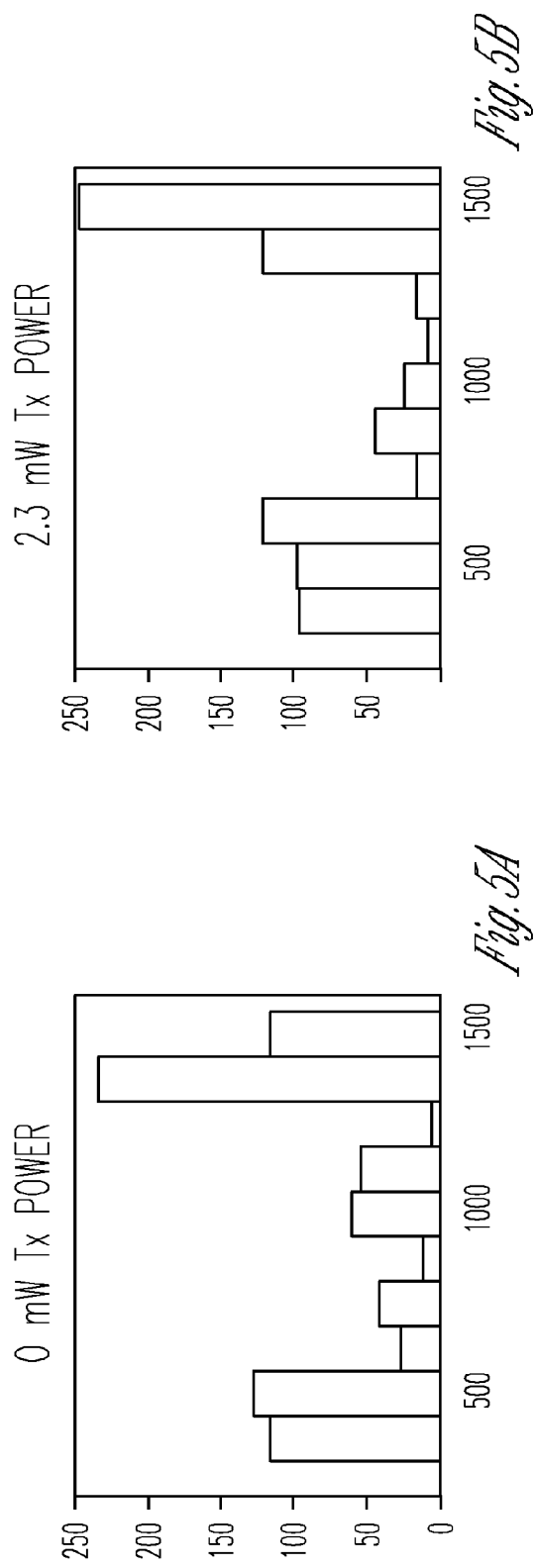
Fig. 5A — 0 mW Tx POWER
Fig. 5B — 2.3 mW Tx POWER
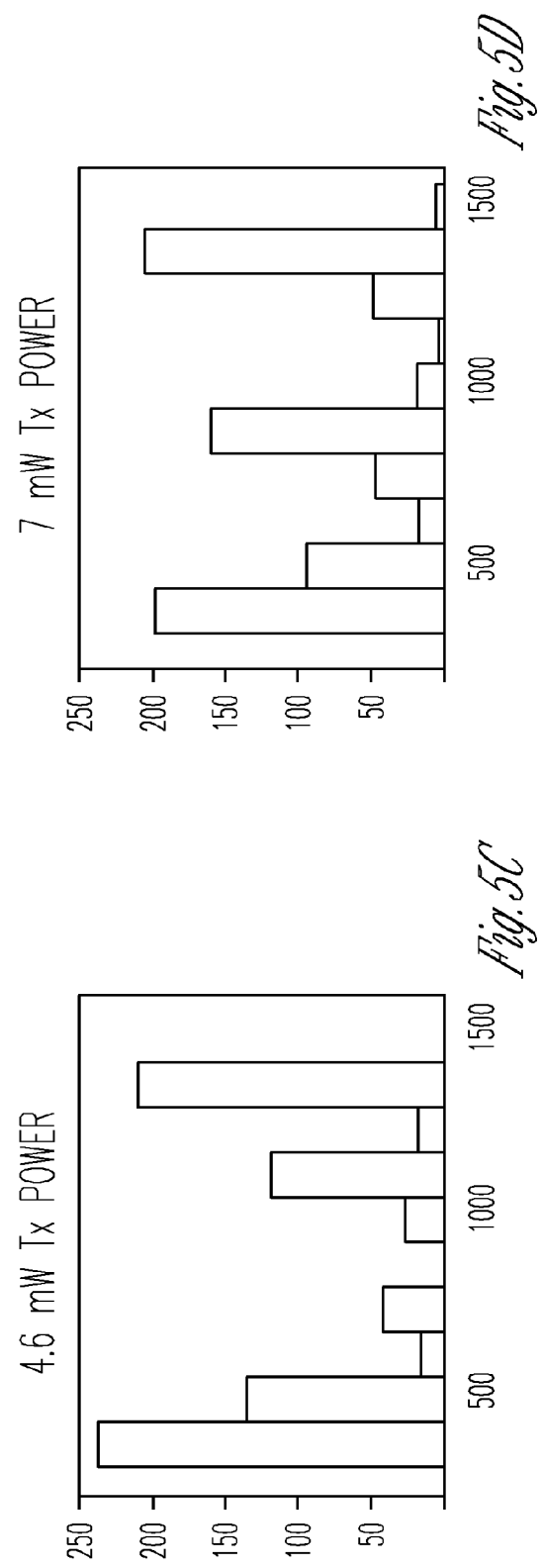
Fig. 5C — 4.6 mW Tx POWER
Fig. 5D — 7 mW Tx POWER

TRANSMIT OPPORTUNITY DETECTION

RELATED APPLICATIONS

This application is a nationalization under 35 U.S.C. 371, and claims the benefit of priority, of PCT/US2010/028891, filed Mar. 26, 2010 and published as WO 2010/11165, on Sep. 30, 2010, which claims the benefit of priority from U.S. Provisional Patent Application Ser. No. 61/164,073, filed Mar. 27, 2009; which applications and publication are hereby incorporated herein by reference in their entirety.

BACKGROUND

In today's world, radio spectrum is a scarce resource. The Federal Communications Commission's (FCC) chart of radio frequency allocation shows that almost all available spectrum has already been heavily licensed. But actual measurements taken by the FCC's Spectrum Policy Task Force have shown that most of current radio spectrum is underutilized and lies vacant most of the time. Cognitive Radios (CR) have been proposed as a revolutionary communication paradigm to address this problem of apparent spectrum scarcity. CRs operate by opportunistically using underutilized spectrum while not degrading the operational quality of the licensed users. In the CR context, the licensed user of a band is called the Primary User (PU) while the cognitive radio operating on the same band is called the Secondary User (SU).

BRIEF DESCRIPTION OF THE DRAWINGS

FIGS. 5A-5D show examples of histograms of the packet sizes for four transmission (Tx) power levels.

DETAILED DESCRIPTION

Figure 1:
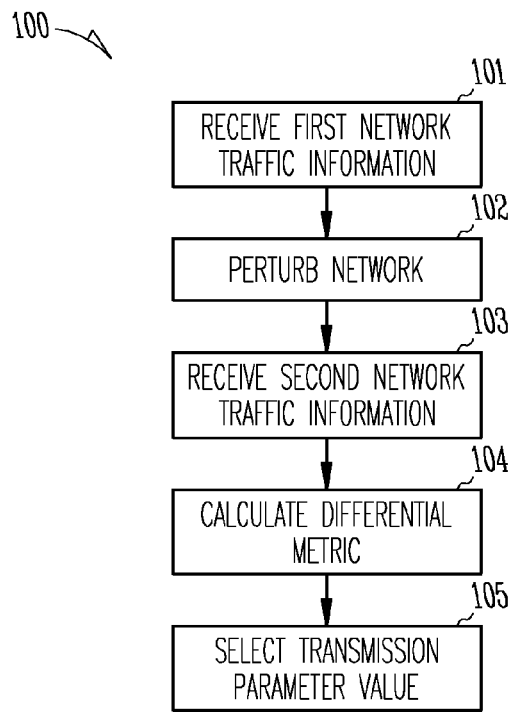
FIG. 1 shows a flowchart for a method for detecting transmission opportunities for a secondary device using a shared network medium according to one embodiment of the present subject matter.

Efficient and reliable detection of transmission opportunity is an enabler of cognitive radio networks. The present subject matter introduces a transmission opportunity sensing paradigm which operates at the media access control (MAC) layer of the primary network in contrast to most previous work.

The present subject matter provides a method for a secondary user of a cognitive radio system to detect a transmission opportunity. The method operates by defining a Media Access Control Layer Interference Metric (MACLIM) which provides an indicator of the health of the primary system. In various embodiments, the method includes a modification of the Kolmogorov-Smirnov goodness-of-fit test that is applied in a sequential manner. In some embodiments, the method includes building an estimate of the probability density of appropriately chosen network statistics, testing for deviation from a prechange distribution of the primary network MACLIMs and detecting an interference event when a deviation from the pre-change distribution crosses a predetermined threshold. Transmission power of each CR can be quantized into discrete levels. In various embodiments, initialization and operation of a system includes constructing an estimate of a pre-change distribution when a CR is not transmitting, increasing transmit power to next level, and executing a sequential Kolmogorov-Smirnov test to check for significant deviation from the pre-change distribution. If the test is negative, increasing power by another step. The method repeats until a communication link is established with a neighboring CR node or a quality of service (QOS) parameter drops below a threshold in the primary system at which time the CR reduces power to the highest non-interfering power level.

A feature of cognitive radio systems is the ability to detect a white space. A white space can be defined as a vacant or underutilized part of the radio spectrum. Such a white space can occur in time where the CR aims to transmit when the primary user (PU) is inactive (time orthogonality); or it can occur in space when the CR aims to transmit at a distance outside the primary transmission range (space orthogonality). Another interpretation of a Cognitive Radio system is in terms of Overlay and Underlay systems. Overlay systems exploit orthogonal transmission policies with respect to the primary user. On the other hand, Underlay systems transmit over a wide band at a extremely low power and work according to an Interference Temperature metric concept. The present subject matter provides expansion of the definition of a white space from beyond the physical layer into the medium access control layer, for both overlay and underlay cognitive radio systems. The present subject matter enables easier creation of cognitive radio applications using off-the-shelf physical layer technologies, and hence eases an entry barrier for getting CR based devices into the market. Additionally, as orthogonal dynamic spectrum access techniques reach their limit, this non-orthogonal cross-layer approach shows a way to enable robust and non orthogonal detection of system transmission opportunities.

Current opportunistic spectrum access techniques work at the physical layer using methods like energy detection, cyclostationarity signal detection, and Multi-resolution spectrum sensing. The present subject matter provides a detection approach at the Medium Access Control Layer level of the OSI model. For example, in various embodiments, A MAC layer approach uses the data packets of the primary system to identify and exploit the transmission opportunities for the secondary system.

Packet Based Networks (PBNs) are predominant in the implementation of today's wireless networks. A popular PBN is the IEEE 802.11 Wireless LAN. Traffic characteristics of PBNs are bursty and difficult to predict. On the other hand, the recently developed IEEE 802.22 standard which operates in the underused television bands is set to be the first practical implementation of Cognitive Radio technology. 802.22 has been designed to coexist with the analog ATSC TV bands. Also, user terminals in 802.22 are at far flung locations separated by kilometers. Thus, the spectrum sensing techniques developed in the context of IEEE 802.22 are not suitable for PBNs like 802.11.

Various embodiments of the present subject matter directly check for the effect of transmission on both the primary network transmitter and the primary receivers. Therefore, even if the primary receiver is out of a transmitting node's sensing range but in the transmitting node's interference range, the transmitting node detects its own effect on the stream of data packet exchanges emanating from it and destined for other primary nodes which are within the transmitting node's sensing range. This property is a unique byproduct of a MAC layer sensing scheme.

Another advantage to the present subject matter is that the sophistication in manufacturing the devices required for implementation is considerably less than that of detection scheme's implemented at the physical layer. For example, off-the shelf components can be deployed with only minor modifications to existing. This consequently implies a shorter time-to-market for any proposed device.

Another advantage of the present subject matter is that, in various embodiments, a modified Kolmogorov-Smirnov test checks for finer drifts and hence is more perceptive to disturbance of the primary network.

The present subject matter includes a non-orthogonal overlay architecture based on detecting changes in the probability density distribution of primary network packet statistics. Specifically, the architecture includes a sequential version of the Kolmogorv-Smirnov goodness-of-fit test which allows the secondary network to operate subject to an interference constraint that ensures a given QOS in the primary network nodes. In one example, the architecture provides an efficient implementation of the test on an experimental test bed and demonstrates its utility and viability under field testing on an IEEE 802.11 WLAN. In various embodiments, the architecture may improve utilization of unused transmit opportunities 50%-75% while limiting the probability of interference to <0.02. In various embodiments, the average detection delay is 140 ms to 290 ms and compares favorably with the traditional physical layer based approaches.

Packet Based Networks (PBNs) are predominant in the implementation of current wireless networks. The most popular PBN is the IEEE 802.11 based Wireless LAN. Traffic characteristics of PBNs are bursty and difficult to predict. There have been many attempts to devise time series based prediction models for the data transmission patterns, but not much success has been achieved to date. As PBNs have become increasingly popular, there has been an accompanying crowding of the spectrum that they use.

In contrast, cognitive radios (CRs) have been proposed as a revolutionary communication paradigm to address the problem of spectrum scarcity. The recently developed IEEE 802.22 Wide Regional Area Network (WRAN) standard is set to be the first commercial implementation of this technology. IEEE 802.22 operates in the underused television bands. As it coexists with the analog ATSC TV signals, it is not suited for a packet based primary network. Also, the user terminals in IEEE 802.22 are at far-flung locations, and the corresponding problems of primary user detection are differently posed than in smaller range WLAN type scenarios. The present subject matter includes a fresh look at the unique challenges posed by coexisting with a PBN based small range Wireless LAN.

The present subject matter provides a novel non-orthogonal channel access method that operates at the MAC layer and exploits the spare data capacity in current PBNs. It conceptually extends the Interference Temperature (IT) approach into a new domain by adapting it to work at the MAC layer. The average detection time of our method is shown to compare favorably to other similar approaches in the literature. For example, in various embodiments, it facilitates a 50%-75% utilization of transmit opportunities that would otherwise be wasted, while interfering with the primary network with a probability of less than 0.02. Thus it delivers a large performance gain over previous dynamic spectrum access methods implemented in the physical layer.

A core technology in a CR system is the method used by secondary users to coexist with primary users. Two philosophies for opportunistic channel access that include orthogonal channel access and non-orthogonal channel access.

Proposed orthogonal channel access methods include orthogonality in time, frequency and space. In time-orthogonal schemes, a CR transmits whenever it detects a quiescent primary network and vacates the channel as soon as it detects the presence of the primary user. In frequency-orthogonal schemes, the secondary user monitors all the frequency bands and transmits on a vacant band. A few popular sensing methods are energy detection, cyclostationarity detection, wavelet based sensing etc.

Proposed non-orthogonal channel access methods allow a CR to coexists on the same channel and at the same time as the primary user. The supporting premise is that the primary system has sufficient spare capacity, measured in terms of SNR or underutilized bandwidth, to support additional secondary users. The cohabitation of the primary and secondary users is proposed to occur subject to the constraint that the primary system maintains a given Quality of Service (QOS). Note that there is no attempt to establish an orthogonal secondary system nor any guarantee of zero interference.

The Federal Communications Commission (FCC) first proposed an Interference Temperature (IT) metric in the context of IEEE 802.22 [3]. The IT concept states that CRs can opportunistically use the primary channel so long as the aggregate interference caused at the primary users does not exceed a certain threshold. IT based schemes are now an active research area in cognitive radios The FCC has displayed a lukewarm attitude towards adopting the IT metric due to opposition from legacy service providers; but this formulation has many theoretical and analytical advantages and holds great promise for implementation in future cognitive radio networks.

The set of methods presented here draw upon diverse approaches from a variety of fields. The Quickest Change Detection/Anomaly Detection problem is to detect the time at which an abrupt shift in a distribution occurs. It has been studied in network intrusion detection literature. The problem addressed by the present subject matter differs in that when the distribution is going to change is known. Thus, whenever CR power is changed, it is certain that the new distribution is going to be different from the pre-change distribution. But, the degree of the change is an unknown and is tested through a sequential KS test. The sequential nature of the test ensures that change is detected as fast as possible. Thus, the focus of the problem is not on when the change occurs but on how much the distributions change. Also, bandwidth and congestion estimation techniques implement QOS-centric MAC layer approaches. FIG. 1 shows a flowchart for a method for detecting transmission opportunities for a secondary device, or node, using a shared network medium according to one embodiment of the present subject matter. The method 100 includes calculating a differential metric 104 based on a first metric and a second metric for a primary network. The primary network uses a medium capable of being shared with a secondary network. The first metric corresponds to a first distribution of traffic on the primary network corresponding to absence of a perturbation of the medium. The second metric corresponds to a second distribution of traffic on the primary network and further corresponds to a perturbation of the medium rom a node on the second network. The node on the second network detects the network traffic on the primary network. The second distribution corresponds to a perturbation from the secondary node. The first distribution corresponds to an absence of the perturbation. In response to the differential metric a transmission parameter, such as transmission power, is selected 105 to either enhance the probability of successful communications of a second network on the shared medium, or minimize the impact of the second network communications on the primary network traffic. In some embodiments, the method includes receiving first network traffic information at the secondary node 101, where the secondary node is seeking to share the network medium with primary nodes. In various embodiments, the primary nodes are nodes licensed or authorized as primary users of the shared network medium. In some embodiments, a secondary node is seeking to establish a second network of secondary nodes using the same medium as the primary nodes without noticeably impacting the service quality of the primary nodes, such as by using excess channel capacity of the shared medium. In some embodiments, the method further includes perturbing the shared medium using a transmission from the secondary node 102, and receiving second network traffic information 103.

Interference Temperature metrics have gained popularity in the Dynamic Spectrum Access community but at the physical layer. The present subject matter provides a robust method for operating CRs at the MAC layer. Our method compares favorably with other approaches which report an opportunity detection delay of 0.08-0.35 seconds.

Figure 2:
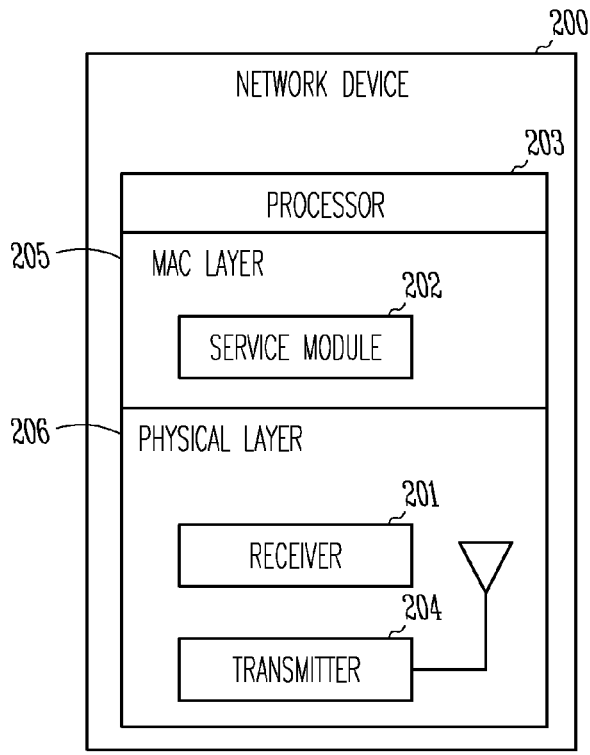
FIG. 2 illustrates generally a secondary network device apparatus as referred to above in FIG. 1 according to one embodiment of the present subject matter.

FIG. 2 illustrates generally a secondary network device apparatus 200 as referred to above in reference to FIG. 1 according to one embodiment of the present subject matter. The apparatus 200 includes a wireless receiver 201, a service module 202, a processor 203 and a wireless transmitter 204. The receiver is configured to receive wireless communications from a networking medium. The service modules uses the received wireless communications to generate a first and second service metric. The first service metric corresponding to a SNR of the received communications absent a perturbation and the second metric corresponding to an SNR in view of the perturbation. In various embodiments, the processor is operates according to a particular architecture using a MAC layer 205. In some embodiments, the service module within the MAC layer as opposed to the physical layer 206 of the architecture.

The following discussion considers a system of N independent cognitive radios (CRs) in an area covered by a single primary packet based network. The present subject matter is described in relation to an IEEE 802.11 WLAN network. It is understood that the method may be applied to other communications protocols without departing from the scope of the present subject matter.

When the system is initialized, each CR has no right to transmit and has no knowledge about whether it is safe to do so. Also, each CR does not know how many other potential secondary users are present in its neighborhood. The proposed method inherently overcomes these obstacles. Each CR starts off with a very conservative transmission policy, and assumes that no other secondary users are present in the neighborhood. Initially, it remains in a passive listening mode until sufficient data is collected to construct an accurate estimate of the pre-change distribution of the primary network packet statistics. In various embodiments, this estimated distribution is the baseline against which each CR tests for possible changes in the state of the primary network.

In various embodiments, a secondary user power control loop of each CR quantifies transmission power of each CR into discrete levels. A CR can transmit over the range $$P_0=0, P_1=\Delta P, P_2=2\Delta P, \ldots, P_{MAX}.$$

Figure 3:
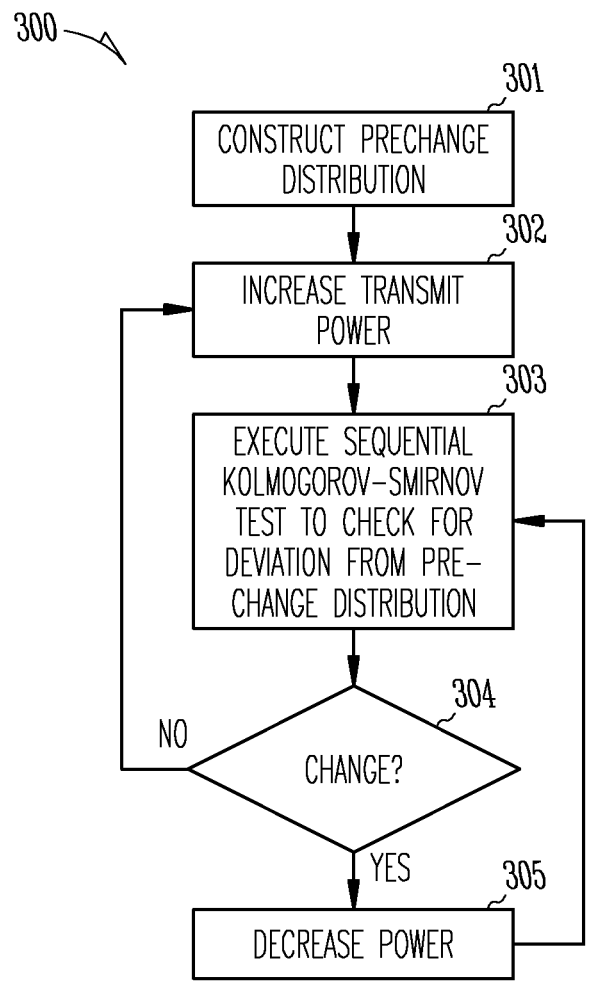
FIG. 3 shows a flowchart of an initialization and operation method of a system according to one embodiment of the present subject.

As the range of the CR depends on its transmit power, transmit power changes dynamically throughout network operation. In addition, for successful data transfer to take place, the range should be large enough to at least reach a nearby CR node. The initialization and operation of a system according to one embodiment of the present subject matter is summarized below and in the flowchart 300 of FIG. 3.

301. Construct an estimate of the Pre-change Distribution F0 when CR is not transmitting.

302. Adjust a CR parameter, such transmit power, to increase CR communication robustness.

303. Run the sequential Kolmogorov-Smirnov test to check for significant deviation from the pre-change distribution.

304. If the test does not show a change in the distribution from the pre change distribution, the CR parameter, such as transmission power, is adjusted 302 to take advantage of identified transmission opportunities.

305. If the test detects a proxy for a QOS drop below a predetermined threshold of the primary network, the CR parameter is adjusted for example, to an identified non-interfering level. A proxy can include a number of test between the pre-change distribution and a distribution, or samples corresponding to a distribution, after a CR attempts to establish, or transmits, using a second network. The method then continues to monitor the network medium using the test 303. It is understood that other transmission related parameters of the CR may be adjusted without departing from the scope of the present subject matter.

Goodness-of-fit (GOF) tests are used to check whether samples are from a given probability distribution. In particular, the Kolmogorov-Smirnov (KS) GOF test evaluates the hypothesis that a sample of length n is drawn from a distribution F(x) that is the same as a specified empirical (or theoretical) probability distribution, F0($x$). The hypothesis to be tested are formulated as shown in (1).

$$H0: F(\chi) = F_0(\chi) \tag{1}$$

$$H1: F(\chi) \neq F_0(\chi) \tag{2}$$

Thus, a GOF test can check for deviations from the pre-change distribution of a CR system. The Chi-square test is a common GOF test. The Chi Square statistic is proportional to the sum of the squared difference between the observed density and the theoretical density. However, the KS test is more adaptable to a CR for the following reasons:

1) The Chi-square statistic is only approximate for small samples. The KS test is preferable over the Chi-square and other tests if the sample size is small, as the KS statistic is exact for small samples. This is valuable for formulating a sequential test.

2) The KS test is the only non-parametric goodness-of-fit test with exactly derivable confidence bands.

3) The KS statistic is a distribution-free statistic.

A Kolmogorov-Smirnov test may be implemented as follows. Let $X_1, X_2, X_2, \ldots, X_n$ be a random sample of size n drawn from an unknown distribution F(x). To test the hypothesis that $F(\chi) = F_0(\chi)$, the empirical cumulative distribution function (e.d.f) of the n samples is calculated as $S_n(\chi)$.

$$S_n(x) = \frac{\text{Number of sample observations} \leq x}{n} \tag{3}$$

The KS distance between the pre-change cumulative distribution F0($x$) and the empirical cumulative distribution Sn(x) is evaluated. When plotted graphically, this shows the greatest vertical distance between the two distributions and is defined as the KS distance Dn, $$D_n = \sup_x |F_0(x) - S_n(x)|. \quad (4)$$

$D^+_n$ and $D^-_n$ are two metrics for a one-sided KS test. $D^+_n$ and $D^-_n$ are used to formulate one-sided confidence bands for finer testing.

$$D^+_n = \sup_x [F_0(x) - S_n(x)] \quad (5)$$

$$D^-_n = \sup_x [S_n(x) - F_0(x)] \quad (6)$$

The distribution-free property of the KS test means that the KS statistics D, $D^+$, and $D^-$ have a distribution function that is independent of the exact form of $F_0(\chi)$. In his classic paper, Kolmogorov proved the existence of a limiting value of $D_n$. (A. Kolmogoroff, "Sulla determinazione empirica di una legge di distribuzione," Giorn. 1st. Ital. Attuari, vol. 4, pp. 83-91, 1933.) Also, there are algorithms which generate the statistic for small finite n and asymptotic approximations as $n \to \infty$, e.g, $$\lim_{n \to \infty} Pr(\sqrt{n} D_n \le d) = \sum_{j=-\infty}^{\infty} (-1)^j e^{-2j^2 d^2}. \quad (7)$$

The Glivenko-Cantelli theorem (J. Durbin, Distribution Theory for Tests Based on the Sample Distribution Function. Society for Industrial Mathematics, 1973.) states that when $F=F_0$, the KS statistic $D_n$ vanishes as shown, $$Pr\left(\lim_{n \to \infty} D_n = 0\right) = 1. \quad (8)$$

As a result, the test is strongly consistent against all alternatives and the false hypothesis is rejected with unity probability as more and more samples are accumulative, e.g, as $n \to \infty$.

Let $\alpha$ be the significance level corresponding to the 100(1−$\alpha$) confidence interval. Also, parameter $d_n(\alpha)$ is the critical value for a given $\alpha$, i.e, it is the probability of incorrectly rejecting the hypothesis in equation (1). We can find the corresponding critical region of the test as shown in (9), $$P\{D_n \ge d_n(\alpha)\} = \alpha. \quad (9)$$

Massey ("The Kolmogorov-Smirnov test for goodness of fit," Journal of the American Statistical Association, vol. 46, no. 253, pp. 68-78, 1951) gives recursive expressions and tables to calculate the critical value for a given a. Note that $\alpha$ is an indicator of the probability of misdetection of the test, discussed below.

Figure 4:
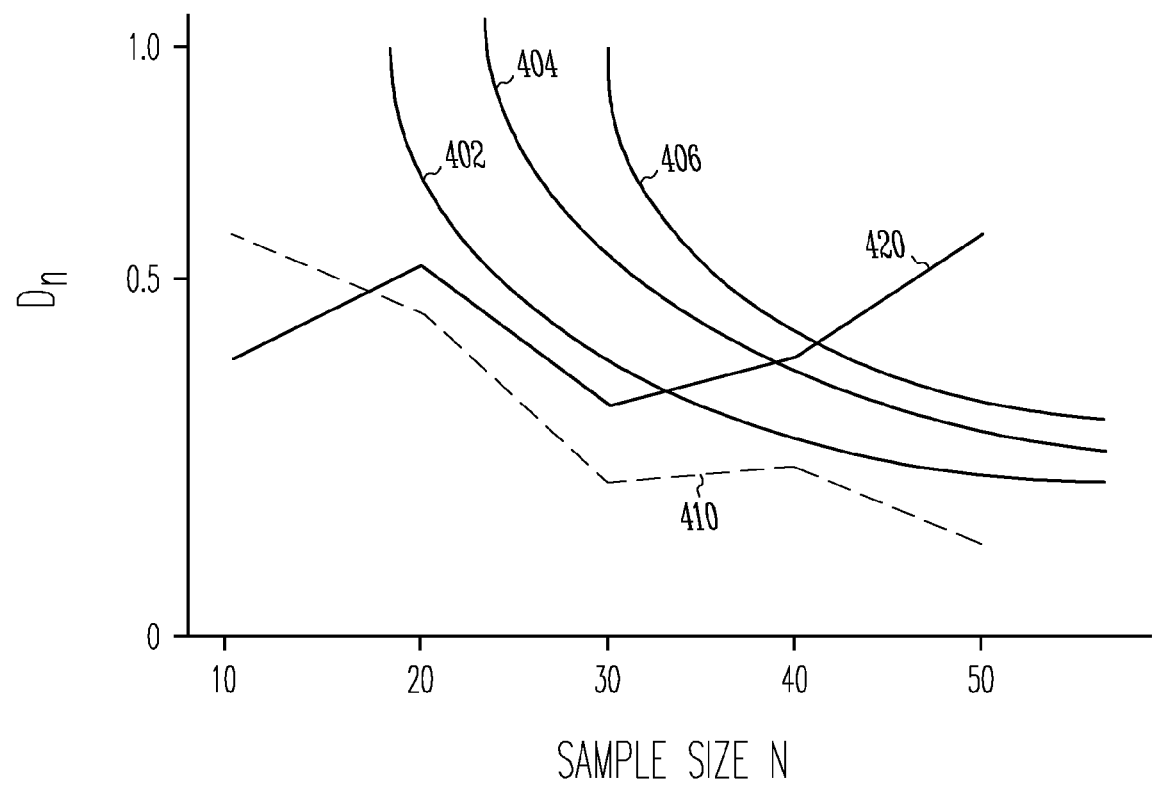
FIG. 4 shows a plot of two possible drifts in test statistic $D_n$ with increasing n.

Having discussed set up of a KS test according to one embodiment of the present subject matter, the sequential version of the KS test is discussed below. Hawkins relates to a formulation of a sequential version of the KS test. (D. Hawkins, "Retrospective and sequential tests for a change in distribution based on kolmogorov-smirnov-type statistics," Sequential Analysis, vol. 7, no. 1, pp. 23-51, 1988.) But, the Hawkins approach proposed a sequential version to tackle the problem of quickest change detection such that the aim of the test was to estimate the change point of a given time series, not the magnitude of the change. This makes the Hawkins approach unsuitable for the situation under consideration. In various embodiments, the present method includes iteratively estimating the KS statistics in an online manner. A benefit of the method includes generating a decision in favor of a hypothesis in a timely and reliable manner. A sequential formulation of the KS test minimizes the time required to reach the decision. In equation (4), the KS statistic depends on the number of samples n. This dependence implies that as the number of samples increases, the width of the confidence band of the test cumulative distribution decreases. FIG. 4 shows a plot of two possible drifts in test statistic $D_n$ 410, 420 with increasing n. Also, superimposed on the plot are the $d_n(\alpha)$ contours corresponding to increasing values of $\alpha$, including $\alpha$=0.1 (402), $\alpha$=0.05 (404), and $\alpha$=0.01 (406). A significance level for the test, $\alpha_{th}$, is initialized to a predetermined value. The test includes collecting samples and updating the empirical cumulative distribution function at each step. In various embodiments, a stopping rule for the sequential test includes collecting samples until the KS statistic crosses the contour corresponding to threshold value $d_n(\alpha_{th})$.

A confidence band is an alternate way of looking at the problem of testing for goodness-of-fit. Known confidence band methods find the 1−$\alpha$ quantile corresponding to $d_\alpha$ of the KS statistic and threshold $D_n$ against the $d_\alpha$ distance. In various embodiments, $d_\alpha$ is used to set a confidence band for a post-change density function. Thus, regardless of the exact form of the pre-change density, the method generates the two equivalent statements in equations (10) and (12). Equation (12) states that the pre-change density function $F_0(\chi)$ lies entirely within a band of $\pm d_\alpha$ from the empirical distribution function $S_n(\chi)$ with a probability of 1−$\alpha$.

$$P\left\{D_n = \sup_x |S_n(x) - F_0(x)| \ge d_\alpha\right\} = \alpha \quad (10)$$

$$P\{S_n(x) - d_\alpha \le F_{0(x)} \le S_n(x) + d_\alpha\} = 1 - \alpha \text{ for } \forall x \quad (11)$$

$$P\{F_0(x) - d_\alpha \le S_n(x) \le F_0(x) + d_\alpha\} = 1 - \alpha \text{ for } \forall x \quad (12)$$

Kernel density estimation is used to approximate the pre-change packet size distributions by a continuous function. The kernel density estimator provides approximation as shown in equation (13).

$$\hat{f}(x) = \frac{1}{n} \sum_{i=1}^{n} K\left(\frac{x - X_i}{h}\right) \quad (13)$$

where h is the bandwidth or smoothing parameter, $X_i$ are the n data points. The choice of the kernel function K(.), the bandwidth chosen and variations based on adaptive kernel estimation derive asymptotically accurate estimates of the probability density function, for example, as $n \to \infty$. Before CR interference is started, the channel is sensed for a sufficient time to accurately estimate the pre-change density. Empirically, it was found that the Epanechnikov kernel with a bandwidth of 60 can give the good approximation in the least time.

Basic statistical principles behind the methods can be applied to various network statistics that remain relatively stationary over moderate time periods including the packet size and retransmission behavior of the network. The following discussion focuses on packet size, but it is understood that application of the method is possible for other statistics and that the present examples using packet size are intended to be demonstrative and not intended to be exclusive or limiting of the application of the It is hypothesized that the primary network maintains a relatively constant packet traffic rate, which is a reasonable assumption over a time window of a few minutes. This is reflected by the stationarity of the perceived available bandwidth over time intervals on the order of minutes. The network traffic is succinctly characterized by the histogram of the distribution of the packet sizes. The IEEE 802.11 protocol limits the maximum length of the packets to 1548 bytes, in practice. A high throughput traffic flow has a histogram concentrated more towards the higher packet sizes, while a low throughput traffic flow has a more evenly balanced histogram. The insertion of interference due to the secondary transmitter causes a shift in the histogram away from the one corresponding to high traffic flow. Reasons for this behavior include, but are not limited to, the secondary transmission acts as addition of noise to the channel and increases the bit error rate (BER) for the primary packets, and the packet error rate (PER) is proportional to the BER and the packet length. Thus, the bigger packets are more prone to be received in error than the smaller packets. Another reason relates to the 802.11 MAC protocol having a fragmentation threshold which controls how longer frames are fragmented into packets. This threshold changes dynamically and decreases when the node perceives an increased PER.

The IEEE 802.11 MAC retransmits a packet if the original transmission is unsuccessful. The packet retry number flag is used to indicate such packets. The retransmissions might be due to traffic congestion or to an increased PER in the channel. It is possible to estimate the channel quality from the proportion of packets that have this flag set and to assess the degradation in primary QOS due to secondary user interference.

Practical implementation of the methods are demonstrated with respect to experiments carried out on an existing network. The primary wireless network is the University of Minnesota's backbone IEEE 802.11 WLAN setup in the infrastructure mode. There are multiple co-located networks and multiple base stations within each network organized into an Extended Service Set (ESS) with a high coverage density. real-world daytime traffic under various levels of interference were captured the by the secondary user. Channels 1, 6 and 11 were in use, and statistics of channel 6 were captured.

Software Defined Radios (SDR) manufactured by Ettus Research were used to create secondary traffic. A Universal Software Radio Peripheral (USRP) transmitter sent a constant power PN sequence at a carrier frequency centered on IEEE 802.11b channel 6.

The secondary transmission power was increased uniformly from 0 up to 7 mW in three steps of 2.3 mW each. The interference power was maintained at each level for 60 seconds to allow the primary network traffic to adjust to the current interference level. Another SDR, positioned at a distance of 10 meters from the transmitting SDR, acted as a receiver and successfully recovered the transmitted PN sequence for all power levels.

Two laptop based test-stations equipped with an Intel Wireless 4965 adapter and running the Kismet Network Analyser under a Ubuntu Heron operating system were used to capture the IEEE 802.11 network traffic. The laptops were placed at a distance of approximately 10 meters from the SDR interferer. Also, the SDR transmitter was placed at distances of approximately 20 and 40 meters from the two nearby dominant 802.11 base stations. During testing at the highest power levels (7 mW), it was observed that upon interfering with a channel, the traffic on that channel migrates to the neighboring channels which present a lower level of interference. To prevent this and to get valid results for comparison with the lower interference power, an additional SDR alternatively inserts interference into the two neighboring channels. The raw captures were processed with the Wireshark program (formerly known as Ethereal) to extract the packet sizes. Later analysis was done in Matlab.

A method according to the present subject matter was implemented on three datasets of packet captures. For one data set, the secondary transmission power was increased uniformly from zero up to 7 mW in three steps as 2.3 mW, 4.6 mW and 7 mW. FIGS. 5A-5D show the histograms of the packet sizes for the four transmission (Tx) power levels. This power was sufficient to cause an inoperable interference to primary base stations within a 1.2 m radius of the secondary transmitter, while the primary base station was tested to work properly at a range of 2.5 m from the secondary transmitter. Also, a secondary receiver could decode the transmissions at 2.3 mW at a distance of up to 12 m to set up a working secondary link.

The data rate of the primary network dropped marginally from an initial 0.161 Mbps to 0.156 Mbps for a transmit power of 2.3 mW and to 0.121 Mbps for a transmit power of 4.6 mW. The Adaptive Modulation and Coding (AMC) mode of the primary WLAN was unchanged for all 4 secondary transmit power levels but changed if we attempted to increase the power further. Application of an embodiment of the method allowed a Tx power of 2.3 mW but curtailed the secondary from transmitting at 4.6 mW or at 7 mW. Thus, a transmission opportunity was safely and reliably created and an operational secondary link was setup with only a marginal effect on the QOS of the primary network. Similar results and threshold transmit powers were obtained for the other datasets.

Figure 6:
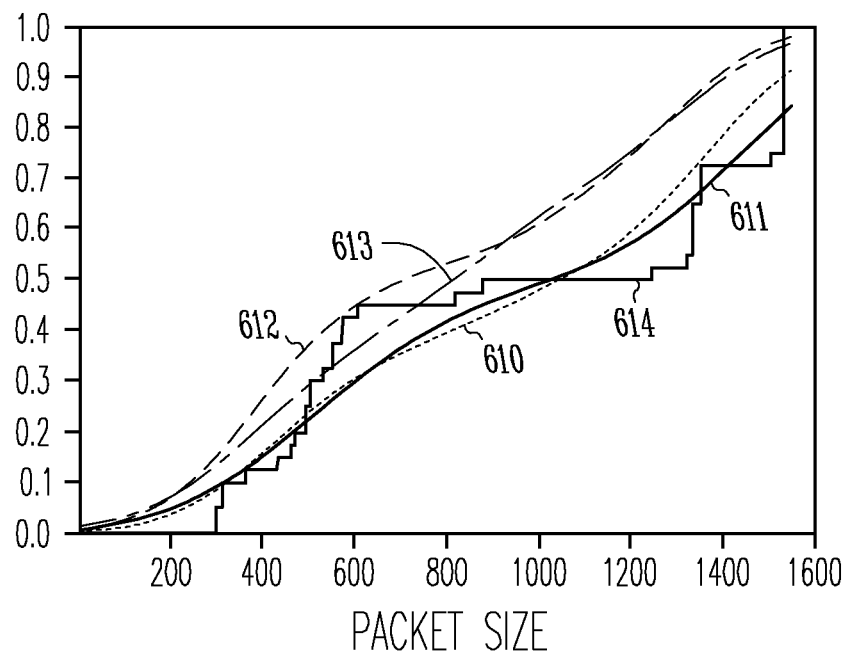
FIGS. 6 and 7 show example kernel density estimates of packet captures.
Figure 7:
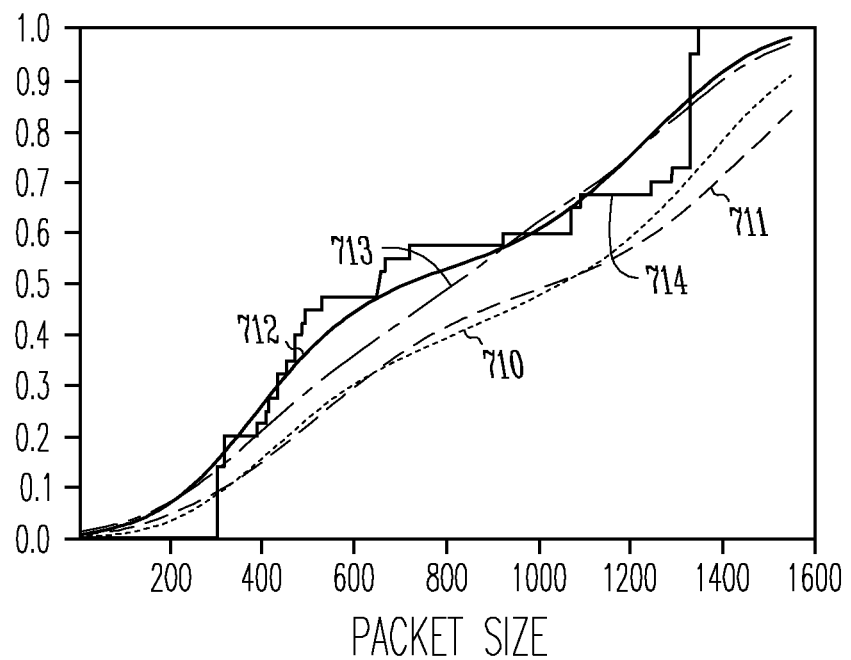
Figure 8:
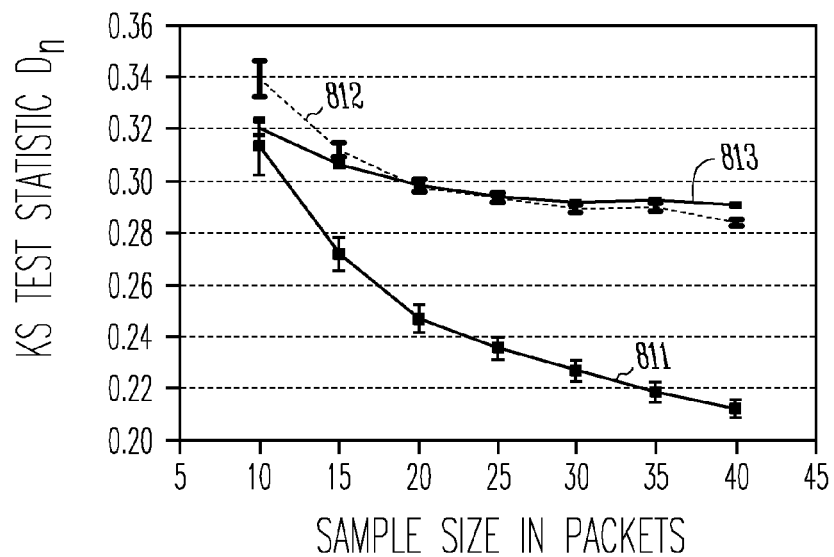
FIG. 8 illustrates example performance results of a Kolmogorov-Smirnov test over 1000 iterations.

FIGS. 6 and 7 show kernel density estimates of the packet captures. The densities were estimated using the full duration of the captures and are considered to be the baseline accurate estimate of the cumulative distribution functions (CDFs). Note the slight shift in the CDF curve when secondary power is increased from 0 (610, 710) to 2.3 mW (611, 711), while a further increase in power to 4.6 mW (612, 712) and 7 mW (613, 713) causes a sudden large shift in the CDF. During the sequential KS test, the approximated empirical estimate of the packet size CDF is calculated using only the packets captured to that instant. The empirically calculated CDF (614, 714) using a duration of 40 packets is shown in FIGS. 6 and 7. Once the empirical CDF is obtained, we run the KS test and obtain the KS distance Dn. The criterion Dn is compared with the distribution tables of the KS statistic to obtain the p-value and the confidence interval. The Sequential Kolmogorov-Smirnov test as explained above was implemented on a dataset for a range of sample sizes from 5 packets to 40 packets. The resulting performance over 1000 iterations of the KS test is plotted in FIG. 8. The standard deviation error bars show that the KS statistic converges to a stable value as the sample size increases. Also, accurate decisions with increased speed are made by a sequential procedure while bounding the maximum sample size to 40 packets. For a sample duration of 20 to 40 packets, the observed average sensing time was between 140 ms to 290 ms. Plot 811 corresponds to a transmit power of 2.3 mW. Plot 812 corresponds to a transmit power of 4.6 mW. Plot 813 corresponds to a transmit power of 7 mW.

Figure 9:
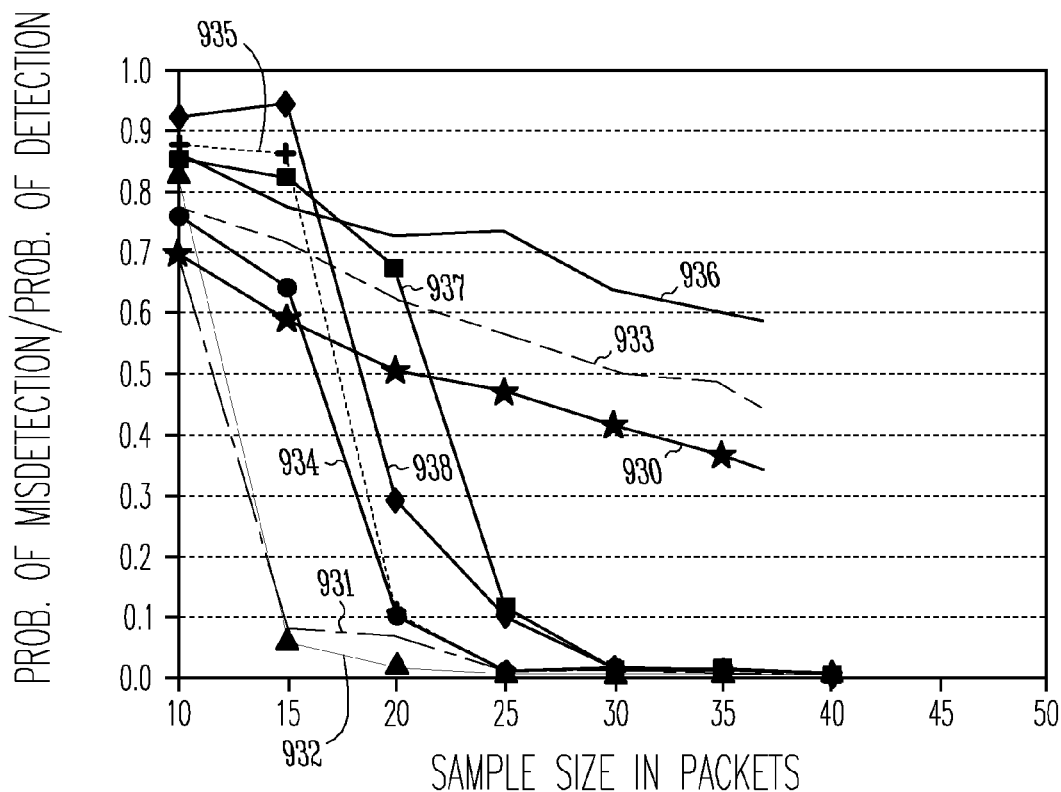
FIG. 9 shows example behavior of the $P_{MD}$ and $P_D$ curves as a sample size increases.

A Probability of Misdetection of Transmission Opportunity ($P_{MD}$) is defined as the probability of deciding the distribution has not changed when in reality it has changed, for example, when transmitting at 4.6 mW or 7 mW. A Probability of Detection of Transmission Opportunity ($P_D$) is defined as the probability of accurately deciding that the distribution has not changed, for example when transmitting at 2.3 mW. FIG. 9 shows the behavior of the $P_{MD}$ and $P_D$ curves as the sample size increases. It is seen that for a given significance level of $\alpha$, the $P_D$ degrades gracefully with increasing sample size while there is an abrupt steep drop in the $P_{MD}$ of the test after a certain sample size. If operation continues in the region after the steep drop, the method senses and utilizes existing transmission opportunities with a 50%-75% accuracy while interfering with the primary network with a probability $P_{MD}<0:1$. This interference rate becomes negligible if we allow slightly larger sample sizes, e.g, for $\alpha=0.05$ and a 30 sample size test, transmit opportunities are detected with a 64% accuracy with an interference probability of 0.02. Plot 930 corresponds to a transmit power of 2.3 mW and an $\alpha=0.15$. Plot 931 corresponds to a transmit power of 4.6 mW and an $\alpha=0.15$. Plot 932 corresponds to a transmit power of 7 mW and an $\alpha=0.15$. Plot 933 corresponds to a transmit power of 2.3 mW and an $\alpha=0.10$. Plot 934 corresponds to a transmit power of 4.6 mW and an $\alpha=0.10$. Plot 935 corresponds to a transmit power of 7 mW and an $\alpha=0.10$. Plot 936 corresponds to a transmit power of 2.3 mW and an $\alpha=0.05$. Plot 937 corresponds to a transmit power of 4.6 mW and an $\alpha=0.05$. Plot 938 corresponds to a transmit power of 7 mW and an $\alpha=0.05$.

CONCLUSION

The present subject matter provides a transmission opportunity sensing method which operates at the MAC layer of the primary network including detecting changes in density distribution of primary network packet statistics. The method includes a sequential Kolmogorv-Smirnov goodness-of-fit test which allows the secondary network to proactively establish communication with other secondary nodes subject to an interference constraint at the primary network nodes.

In first example method includes calculating a differential metric based on a first metric and a second metric for a primary network, the primary network having a medium shared with a secondary network, the first metric based on a first distribution of traffic on the primary network and corresponding to absence of a perturbation of the medium, the second metric based on a second distribution of traffic on the primary network and corresponding to a perturbation of the medium from a node on the secondary network; and selecting a transmission power for the node based on the differential metric.

In a second example, the method of the first example can optionally include determining at least one of the first metric and the second metric using a distributional divergence metric. In a third example, the method of any of the first through second examples can optionally include iteratively estimating the second metric.

In a fourth example, the method of any of the first through third examples can optionally include that selecting the transmission power includes determining a power level that provides a minimum signal-to-noise ratio (SNR) of a node on the primary network. The selecting a transmission power can optionally include incrementally increasing the transmission power if the differential metric meets a threshold criteria indicative of an insubstantial divergence between the first distribution and the second distribution. The selecting a transmission power can optionally include reducing the transmission power if the differential metric does not meet a threshold criteria indicative of an insubstantial divergence between the first distribution and the second distribution.

In a fifth example, the method of any of the first through fourth examples can optionally include that calculating the differential metric includes implementing a goodness-of-fit (GOF) test with respect to the first distribution using primary network samples corresponding to the second distribution. The implementing the GOF test can optionally include executing a sequential Kolmogorov-Smirnov algorithm. In a further example, the selecting a transmission power can optionally include incrementally increasing the transmission power if the differential metric meets a threshold criteria indicative of an insubstantial divergence between the first distribution and the second distribution. In yet a further example, the selecting a transmission power can optionally include reducing the transmission power if the differential metric does not meet a threshold criteria indicative of an insubstantial divergence between the first distribution and the second distribution.

In a sixth example, an apparatus includes a receiver configured to receive information corresponding to a primary network, the primary network having a medium shared with a secondary metric, a service module to generate a first service metric corresponding to a signal to noise ratio (SNR) of the received information in absence of a perturbation on the medium and to generate a second service metric corresponding to a SNR of the received information in view of the perturbation, a processor configured to generate a result based on a first comparison of the first service metric and the second service metric and configured to select a transmission parameter based on the result, and a transmitter configured to transmit information using the secondary network and using the transmission parameter, the transmitter configured to provide the perturbation.

In a seventh example, the processor of the sixth example can optionally be configured to operate using a Media Access Control (MAC) layer, the MAC layer including the service module. In an eighth example, the transmission parameter of any of the seventh or eighth examples can optionally include a transmission power parameter. In a further example, the processor can optionally be configured to incrementally increase the transmission power parameter based on a second comparison of the result and a predetermined criteria. In yet a further example, the processor can optionally be configured to reduce the transmission power parameter based on a second comparison of the result and a predetermined criteria.

This application is intended to cover adaptations and variations of the present subject matter. It is to be understood that the above description is intended to be illustrative, and not restrictive. The scope of the present subject matter should be determined with reference to the appended claim, along with the full scope of legal equivalents to which the claims are entitled.

What is claimed:

1. A method comprising:
    calculating a differential metric using a processor of a node on a secondary network, the differential metric based on a first metric and a second metric for a primary network, the primary network having a medium shared with the secondary network, the first metric based on a first distribution of traffic on the primary network and corresponding to absence of a perturbation of the medium, the second metric based on a second distribution of traffic on the primary network and corresponding to a perturbation of the medium from the node; and
    selecting a transmission power for the node based on the differential metric.

2. The method of claim 1, further including determining at least one of the first metric and the second metric using the processor of the node and a distributional divergence metric.

3. The method of claim 1, further including iteratively estimating the second metric using the processor of the node.

4. The method of claim 1, wherein selecting the transmission power includes determining a power level that provides a minimum signal-to-noise ratio (SNR) of a node on the primary network using the processor of the node.

5. The method of claim 4, wherein selecting a transmission power includes incrementally increasing the transmission power if the differential metric meets a threshold criteria indicative of an insubstantial divergence between the first distribution and the second distribution.

6. The method of claim 4, wherein selecting a transmission power includes reducing the transmission power if the differential metric does not meet a threshold criteria indicative of an insubstantial divergence between the first distribution and the second distribution.

7. The method of claim 1, wherein calculating the differential metric includes implementing a goodness-of-fit (GOF) test with respect to the first distribution using primary network samples corresponding to the second distribution.

8. The method of claim 7, wherein implementing the GOF test includes executing a sequential Kolmogorov-Smirnov algorithm.

9. The method of claim 8, wherein selecting a transmission power includes incrementally increasing the transmission power if the differential metric meets a threshold criteria indicative of an insubstantial divergence between the first distribution and the second distribution.

10. The method of claim 8, wherein selecting a transmission power includes reducing the transmission power if the differential metric does not meet a threshold criteria indicative of an insubstantial divergence between the first distribution and the second distribution.

11. An apparatus comprising:
a receiver configured to receive information corresponding to a primary network, the primary network having a medium shared with a secondary metric;
a service module to generate a first service metric corresponding to a signal to noise ratio (SNR) of the received information in absence of a perturbation on the medium and to generate a second service metric corresponding to a SNR of the received information in view of a perturbation generated by the apparatus on the network;
a processor configured to generate a result based on a first comparison of the first service metric and the second service metric and configured to select a transmission parameter based on the result; and
a transmitter configured to transmit information using the secondary network and using the transmission parameter, the transmitter configured to provide the perturbation.

12. The apparatus of claim 11, wherein the processor is configured to operate using a Media Access Control (MAC) layer, the MAC layer including the service module.

13. The apparatus of claim 11, wherein the transmission parameter includes a transmission power parameter.

14. The apparatus of claim 13, wherein the processor is configured to incrementally increase the transmission power parameter based on a second comparison of the result and a predetermined criteria.

15. The apparatus of claim 13, wherein the processor is configured to reduce the transmission power parameter based on a second comparison of the result and a predetermined criteria.

* * * * *